(12) United States Patent
Karagiannis

(10) Patent No.: US 6,925,075 B2
(45) Date of Patent: Aug. 2, 2005

(54) METHOD AND SYSTEM FOR INTER-OPERABILITY BETWEEN MOBILE IP AND RSVP DURING ROUTE OPTIMIZATION

(75) Inventor: Georgios Karagiannis, Neede (NL)

(73) Assignee: Telefonaktiebolaget LM Ericsson, Stockholm (SE)

( * ) Notice: Subject to any disclaimer, the term of this patent is extended or adjusted under 35 U.S.C. 154(b) by 925 days.

(21) Appl. No.: 09/904,315

(22) Filed: Jul. 12, 2001

(65) Prior Publication Data

US 2002/0015395 A1 Feb. 7, 2002

Related U.S. Application Data

(60) Provisional application No. 60/221,931, filed on Jul. 31, 2000.

(51) Int. Cl.$^7$ ................................................. H04Q 7/24
(52) U.S. Cl. ...................................... 370/338; 370/238
(58) Field of Search ................................ 370/238, 338, 370/389, 465; 455/432.1, 433

(56) References Cited

U.S. PATENT DOCUMENTS

| | | | | |
|---|---|---|---|---|
| 6,141,325 A | * | 10/2000 | Gerstel | 370/238 |
| 6,578,085 B1 | * | 6/2003 | Khalil et al. | 709/241 |
| 6,822,971 B1 | * | 11/2004 | Mikkonen | 370/475 |
| 2004/0024901 A1 | * | 2/2004 | Agrawal et al. | 709/238 |

FOREIGN PATENT DOCUMENTS

CA 2292321 7/2000

OTHER PUBLICATIONS

Jain, Ravi et al. "Mobile Internet Access and QoS Guarantees Using Mobile IP and RSVP with Location Registers". IEEE Communications, 1998. pp. 1690–1695.

Leu, Yuh–Rong et al. "Implementation Considerations for Mobile IP". IEEE Proceedings on the Twenty–First Annual International Computer Software and Applications Conference COMPSAC '97. Aug. 1997. pp. 478–481.

Perkins, Charles E. et al. "Optimized Smooth Handoffs in Mobile IP". IEEE Proceedings of International Symposium on Computers and Communications. Jul. 1999. pp. 340–346.

Yap, C.N. et al. "Novel and Enhanced Mobile Internet Protocol for Third Generation Cellular Environments Compared to MIP and MIP–LR". 3G Mobile Communications Technologies. IEEE 2000. pp. 143–147.

(Continued)

Primary Examiner—Duc Ho
Assistant Examiner—Thien D Tran (57) ABSTRACT

A correspondent host that needs to begin a real-time packet-data session with a mobile node sends a mobile IP binding request message to a home agent of the mobile node. The correspondent host does not send any further messages until it has received a binding update message in response to the binding request message. Upon receipt of the binding update message, the correspondent host knows a care-of address of the mobile node. A binding to the care-of address is created responsive to receipt of the binding update message. An RSVP PATH message is sent by the correspondent host responsive to receipt of the binding update message. The RSVP PATH message explicitly binds a data path of a packet flow to the mobile node. The correspondent host perceives a RSVP RESV message in response to the RSVP PATH message.

21 Claims, 5 Drawing Sheets

OTHER PUBLICATIONS

International Search Report as Completed on Jan. 10, 2002, by the ISA/EP, in connection with International Patent Application No. PCT/SE01/01694.

Karagiannis, G., "Mobile IP, State of the Art Report", Internet Next Generation report. <<http://w3-emn.ericsson.se/project_Q_wing/documents/mobip_a.pdf>>. Jul. 13, 1999 (pp. 1–63).

S. Deering, "ICMP Router Discovery Messages", RFC 1256, Sep. 1991, pp. 1–17.

R. Droms, "Dynamic Host Configuration Protocol", RFC 1541, Oct. 1993, pp. 1–34.

W. Simpson, "The Point–to–Point Protocol (PPP)", RFC 1661, Jul. 1994, pp. 1–46.

C. Perkins, "IP Mobility Support", RFC 2002, Oct. 1996, pp. 1–68.

C. Perkins, "IP Encapsulation within IP", RFC 2003, Oct. 1996, pp. 1–12.

C. Perkins, "Mobile IP", IEEE Communications Magazine, May 1997, pp. 1–15.

R. Braden, "Resource ReSerVation Protocol (RSVP)–Version 1 Functional Specification", IETF RFC 2205, Sep. 1997, pp.1–96.

C. Perkins, "Mobile Networking Through Mobile IP", IEEE Internet Computing, 1998, pp. 1–16.

U. Black, "Voice Over IP", Prentice Hall Series in Advanced Communications Technologies, 2000.

D. Durham, R. Yavatkar, "Inside the Internet's Resource reSerVation Protocol: Foundations for Quality of Service", John Wiley & Sons, Inc. 1999.

Charles Perkins, Nokia Research Center, David B. Johnson, Carnegie Mellon University, "Route Optimization in Mobile IP, draft–ietf–mobileip–optim–11.txt," Mobile IP Working Group, Internet Draft, Sep. 6, 2001, pp. 1–26.

David B. Johnson, Rice University, Charles Perkins, Nokia Research Center, "Mobility Support in IPv6, <draft–ietf–mobileip–ipv6–14.txt>," IETF Mobile IP Working Group, Internet Draft, Jul. 2, 2000, pp. 1–122.

* cited by examiner

METHOD AND SYSTEM FOR INTER-OPERABILITY BETWEEN MOBILE IP AND RSVP DURING ROUTE OPTIMIZATION

RELATED APPLICATIONS

This patent application claims the benefit of priority from and incorporates by reference the entire disclosure of U.S. Provisional Patent Application No. 60/221,931, filed on Jul. 31, 2000.

BACKGROUND

1. Technical Field of the Invention

The present invention relates in general to the field of wireless packet-data communications, and in particular, by way of example but not limitation, to interoperability between mobile IP and RSVP during route optimization.

2. Description of Related Art

Mobile Internet Protocol (mobile IP) is a protocol designed to support mobile Internet access. Mobile IP permits continuous network connectivity anywhere within a network a mobile node happens to be located. Mobile IP is able to track a mobile node without having to change the mobile node's permanent IP address. In mobile IP, data is transmitted to the permanent IP address of the mobile node, which address is associated with a home agent of the mobile node. Most typically, when the mobile node is outside its home network, the home agent will forward data to the mobile node in care of a foreign agent through a process of encapsulating the data, most typically referred to as tunneling.

Once the data packets are received by the foreign agent, the data will be decapsulated and forwarded to the mobile node. Mobile IP includes mobile IP version 4 (mobile IPv4), specified in Internet Engineering Task Force (IETF) Request For Comment (RFC) 2002, and mobile IP version 6 (mobile IPv6). One of a number of differences between mobile IPv4 and mobile IPv6 is the absence of a foreign agent in mobile IPv6. In mobile IPv6, the mobile node handles some of the functions that the foreign agent handles in mobile IPv4, as will be described in more detail below.

The home agent is a node on the home network of the mobile node that tunnels packet data for delivery to the mobile node when the mobile node is outside the home network. The home network of the mobile node is a network that has the same network prefix of the permanent address of the mobile node. A foreign agent is a node on a foreign network that provides routing services to the mobile node while the mobile node is registered with the foreign agent. A foreign network is defined as any network other than the home network.

A mobile node that is outside its home network must register a care-of address with its home agent to receive terminating packet data from the home agent. The mobile node can register the care-of address through a foreign agent, which forwards mobile IP registration information of the mobile node to the home agent. A care-of address is the termination point of a tunnel for packet data forwarded to the mobile node when the mobile node is outside its home network. The mobile node registers its care-of address with its home agent so that packet data intended for the mobile node can reach the mobile node.

When the mobile node is in its home network, it can receive packet data from the home agent without using a care-of address. The care-of address of the mobile node can change when network conditions change, such as, for example, when the mobile node roams from a first foreign network to a second foreign network.

The roaming mobile node can potentially change its network attachment point each time it moves to a new IP sub-network, which roaming can potentially cause a disruption in delivery of packet data bound for the mobile node. Mobile IP permits changes in network attachments in a manner that ensures that packet data is seamlessly delivered across attachment points.

Figure 1:
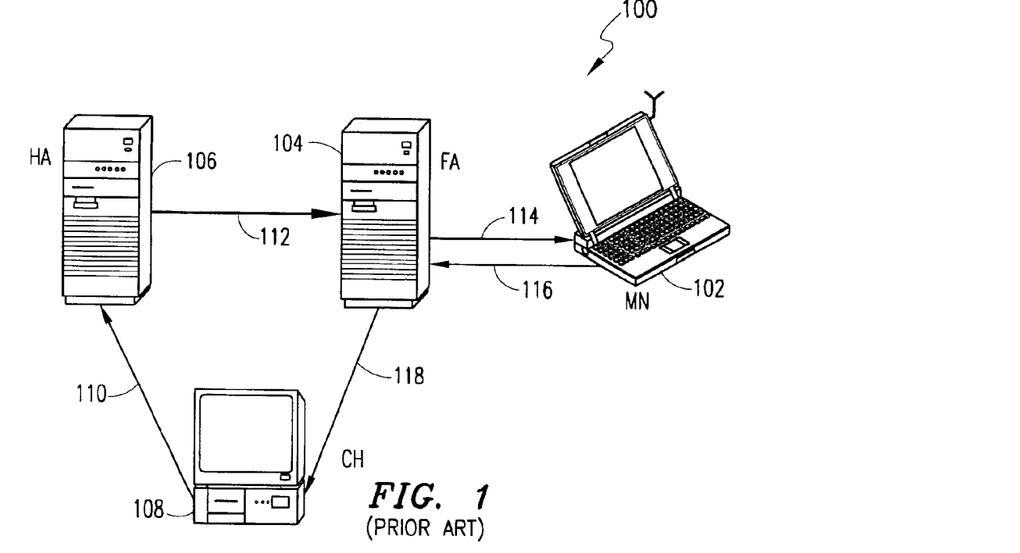
FIG. 1, previously described, is a block diagram of a system that illustrates mobile IP packet-data flow.

Reference is now made to FIG. 1, wherein there is shown a block diagram of a system 100 that illustrates mobile IP packet-data flow. The system 100 includes a mobile node 102, a foreign agent (FA) 104, a home agent (HA) 106, and a correspondent host (CH) 108. The home agent 106 is the home agent of the mobile node 102 and the foreign agent 104 is currently being accessed by the mobile node 102 for packet-data services. The correspondent host 108 is in communication with the mobile node 102 as described in more detail below.

The correspondent host 108 sends a packet intended for the mobile node 102 via a message 110 to the home agent 106. The home agent 106 delivers the packet from a home network of the mobile node 102 to a care-of address of the mobile node 102 via a message 112 to the foreign agent 104. The packet can be delivered from the home agent 106 to the foreign agent 104 via the message 112 only if the packet is tunneled in a manner that causes the care-of address of the mobile node 102 to appear as the destination IP address of the packet.

After the foreign agent 104 has received the packet, the foreign agent 104 decapsulates the packet, so that the packet will appear to have a home address of the mobile node 102 as its destination IP address. Because the now-decapsulated packet is addressed to the home address of the mobile node 102, the packet is processed properly by upper protocol layers, such as, for example, transmission control protocol (TCP). After the packet has been decapsulated by the foreign agent 104, the packet is sent to the mobile node 102 via a message 114. Mobile IP packet-data flow that follows a route similar to that of the messages 110, 112, and 114 is commonly referred to as triangle routing.

Packet data sent by the mobile node 102, such as, for example, in a message 116, is delivered according to standard IP routing procedures. Thus, a packet sent by the mobile node 102 to the correspondent host 108 would be sent via the message 116 and a message 118.

Figure 2:
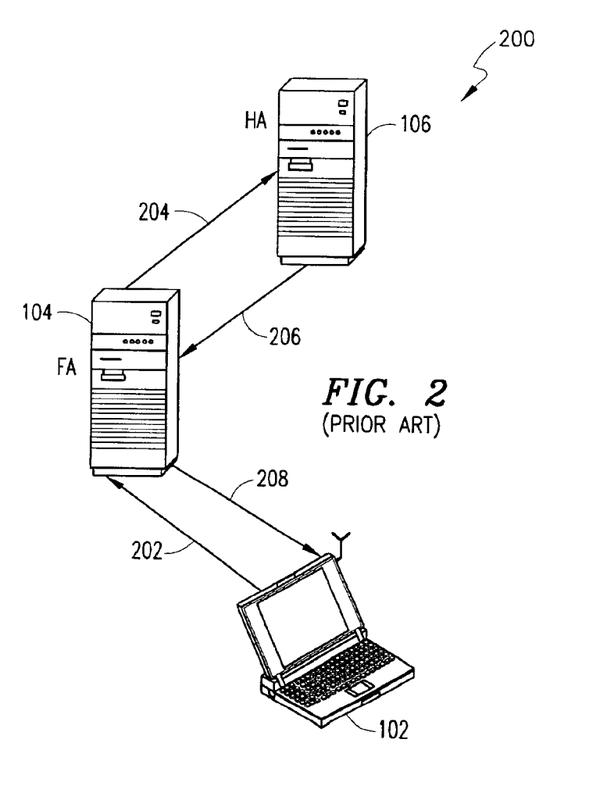
FIG. 2, previously described, is a block diagram of a system that illustrates discovery, registration, and tunneling of a care-of address of a mobile node.

Reference is now made to FIG. 2, wherein there is shown a block diagram of a system 200 that illustrates discovery, registration, and tunneling of a care-of address of a mobile node. A care-of address discovery procedure used in mobile IP is based on the Internet Control Message Protocol (ICMP) Router Advertisement Standard as specified in Request for Comment (RFC) 1256. In mobile IPv4, router advertisements are extended to also include the care-of address. These extended router advertisements are known as agent advertisements. Home agents and foreign agents typically broadcast agent advertisements at regular intervals.

The system 200 includes the mobile node 102, the foreign agent 104, and the home agent 106. In a message 202, the mobile node 102 requests service from the foreign agent 104. In message 204, the foreign agent relays the request of the mobile node 102 to the home agent 106. In message 206, the home agent accepts or denies the request from the foreign agent in message 204. In message 208, the foreign agent 104 relays the acceptance or denial of the home agent 106 of the message 206 to the mobile node 102.

After the mobile node 102 obtains a care-of address from the foreign agent 104, it must inform the home agent 106 of the care-of address. In mobile IP, this is accomplished using the registration procedure illustrated in FIG. 2. The mobile node 102 sends a registration request, messages 202 and 204, using the User Datagram Protocol (UDP) with the care-of address information. This information is received by the home agent and, if the request is approved, the home agent 106 adds necessary information regarding the care-of address to its routing table and sends a registration reply (e.g., the messages 206 and 208) back to the mobile node 102.

All mobility agents (i.e., home agents and foreign agents) using mobile IPv4 must be able to use a default encapsulating mechanism included in the IP within IP protocol as defined by Request for Comment (RFC) 2003. The source of the tunnel (e.g., the home agent 106) inserts an IP tunnel header before the header of any original IP packet addressed to the home address of the mobile node 102. The destination of this tunnel is the care-of address of the mobile node 102. In IP within IP an indication that the next protocol header is also an IP header is accomplished by indicating in the tunnel header that a higher level protocol number is 4. The entire original IP header is thus preserved as the first part of the payload of the packet. Elimination of the tunnel header allows the original packet to be recovered.

Operation of mobile IP has been extended to permit more efficient routing procedures, so that IP packets can be routed from a correspondent host to a mobile node without being first routed to a home agent. These extensions are referred to as route optimization. In route optimization, a correspondent host receives a binding update message from a mobile node's home agent that includes the mobile node's care-of address. The binding update message specifies an association of the home address of the mobile node with a care-of address for that mobile node, along with a pre-determined remaining lifetime of the association. The binding is stored by the correspondent host in a binding cache and is used to tunnel IP packets by the correspondent host directly to the care-of address, thus bypassing the mobile node's home agent. Use of the binding update message eliminates the triangular routing illustrated in FIG. 1. IP packets sent by the correspondent host employ the triangle routing until the binding update message sent by the mobile node's home agent has been received by the correspondent host.

Route optimization also includes a binding request message. The binding request message is sent by the correspondent host to the home agent when the correspondent host determines that its binding should be initiated or refreshed. If the home agent cannot find or does not want to inform the correspondent host of the mobile node's care-of address, such as, for example, if the mobile node is in its home network, the home agent sends a binding update message to the correspondent host that includes a care-of address that is set equal to the mobile node's home address and an association lifetime set to zero. The correspondent host must then delete the binding cache entry for that particular mobile node upon expiration of the association lifetime.

Real-time packet-data services, such as, for example, IP multi-media and Voice over IP (VoIP), impose Quality of Service (QoS) requirements on networks that support these services. One way of meeting these QoS requirements is to reserve predefined resources on a packet-data session path used by the services. A Resource reSerVation Protocol (RSVP) has been specified in IETF RFC 2205 that can be initiated to provide necessary information to routers located in a packet-data session path used by real-time packet-data service applications.

RSVP can be used by an application to inform a serving Internet infrastructure of its Quality of Service (QoS) requirements. RSVP is initiated by an application at the beginning of a packet-data session identified by destination IP address, transport layer protocol type, and destination port number.

Resources reserved by RSVP for a given packet-data session are used for all packets included in that packet-data session. Therefore, all of the packets will include details of the session to which they belong. The primary RSVP messages are PATH and RESV messages. The PATH message, which is sent by an initiator of the packet-data session, explicitly binds the data path of the packet flow and describes the capabilities of the source. The RESV message, which is issued by the receiver of the initial packet data, follows exactly the same path that the PATH message took, hop-by-hop, back to the source. The RESV message may, on its way back to the source, install QoS states at each hop. These states are associated with the specific QoS resource requirements of the destination. The RSVP reservation states are temporary states (i.e., soft states) that must be updated periodically. If these states are not updated, they will be removed.

It is expected that real-time packet-data applications, such as, for example, VoIP or IP multi-media, will require a combination of either mobile IPv4 or mobile IPv6 and RSVP in order to ensure that the applications will not be terminated if the mobile node roams into another network and also to ensure that imposed QoS requirements will be satisfied. However, the route optimization, which applies to both mobile IPv4 and mobile IPv6, used to solve the triangle-routing situation discussed above causes inter-operability problems between mobile IP and RSVP.

There is accordingly a need for a method and system for inter-operability between mobile IP and RSVP during route optimization that solves these and other drawbacks associated with the prior art.

SUMMARY

These and other deficiencies of the prior art are overcome by embodiments of the present invention. Embodiments of the present invention provide a method and system for inter-operability between the Mobile IP and RSVP protocols during route optimization. A correspondent host that needs to begin a real-time packet-data session with a mobile node sends a mobile IP binding request message to a home agent of the mobile node. A correspondent host preferably does not send any further messages until it has received a binding update message in response to the binding request message. Upon receipt of the binding update message, the corresponding host knows a care-of-address of the mobile node. A binding to the care-of-address is created in response to receipt of the binding update message. An RSVP PATH message is sent by the correspondent host in response to receipt of the binding update message. The RSVP PATH message explicitly binds a data path of a packet flow to the mobile node. The correspondent host preferably perceives an RSVP RESV message in response to the RSVP PATH message.

In an embodiment of the present invention, a route-optimization method includes the steps of sending a binding request and receiving a binding update in response to the binding request. The binding update includes a care-of address of a mobile node. A binding to the care-of address is created responsive to receipt of the binding update. A path message is sent responsive to receipt of the binding update.

The path message explicitly binds a data path of a packet flow to the mobile node. A reservation request message is received responsive to the path message.

In another embodiment of the present invention, a route-optimization method includes the steps of receiving a binding request and sending a binding update in response to the binding request. The binding update includes a care-of address of a mobile node. A binding to the care-of address is created responsive to receipt of the binding update. A path message that explicitly binds a data path of a packet flow to the mobile node is sent responsive to receipt of the binding update. A reservation request message is sent responsive to the path message.

In yet another embodiment of the present invention, a route-optimization method includes the steps of receiving a binding request and sending a binding update in response to the binding request. The binding update includes a care-of address of a mobile node. A path message sent in response to receipt of the binding update is received. The path message explicitly binds a data path of a packet flow to the mobile node. A reservation request message is sent responsive to the path message.

In yet another embodiment of the present invention, a route-optimization system includes a home agent and a correspondent host. The home agent receives a binding request and sends a binding update responsive to the binding request. The binding update includes a care-of address of a mobile node. The correspondent host receives the binding update and sends a path message. The path message explicitly binds a data path of a packet flow to the mobile node. The path message is sent in response to receipt of the binding update. A reservation request message is received in response to the path message.

The above-described and other features of embodiments of the present invention are explained in detail below with reference to illustrative examples shown in the accompanying Drawings. Those of ordinary skill in the art will appreciate that the described embodiments are provided for purposes of illustration and understanding and that numerous equivalent embodiments are also contemplated in this patent application.

BRIEF DESCRIPTION OF THE DRAWINGS

A more complete understanding of embodiments of the present invention can be achieved by reference to the following Description when taken in conjunction with the accompanying Drawings wherein.

DETAILED DESCRIPTION OF PREFERRED EXEMPLARY EMBODIMENTS OF THE PRESENT INVENTION

In the following Description, for purposes of explanation and not limitation, specific details are set forth in order to provide a thorough understanding of preferred embodiments of the invention. However, it will be apparent to those of ordinary skill in the art that embodiments of the present invention can be practiced in other embodiments that depart from these specific details. In other instances, detailed descriptions of well-known methods, devices, logical code (e.g., hardware, software, firmware), etc. are omitted so as not to obscure description of embodiments of the present invention with unnecessary detail. Preferred embodiments of the present invention and its advantages are best understood by referring to FIGS. 1–6 of the Drawings, in which like numerals are used for like and corresponding parts of the various Drawings.

Figure 3:
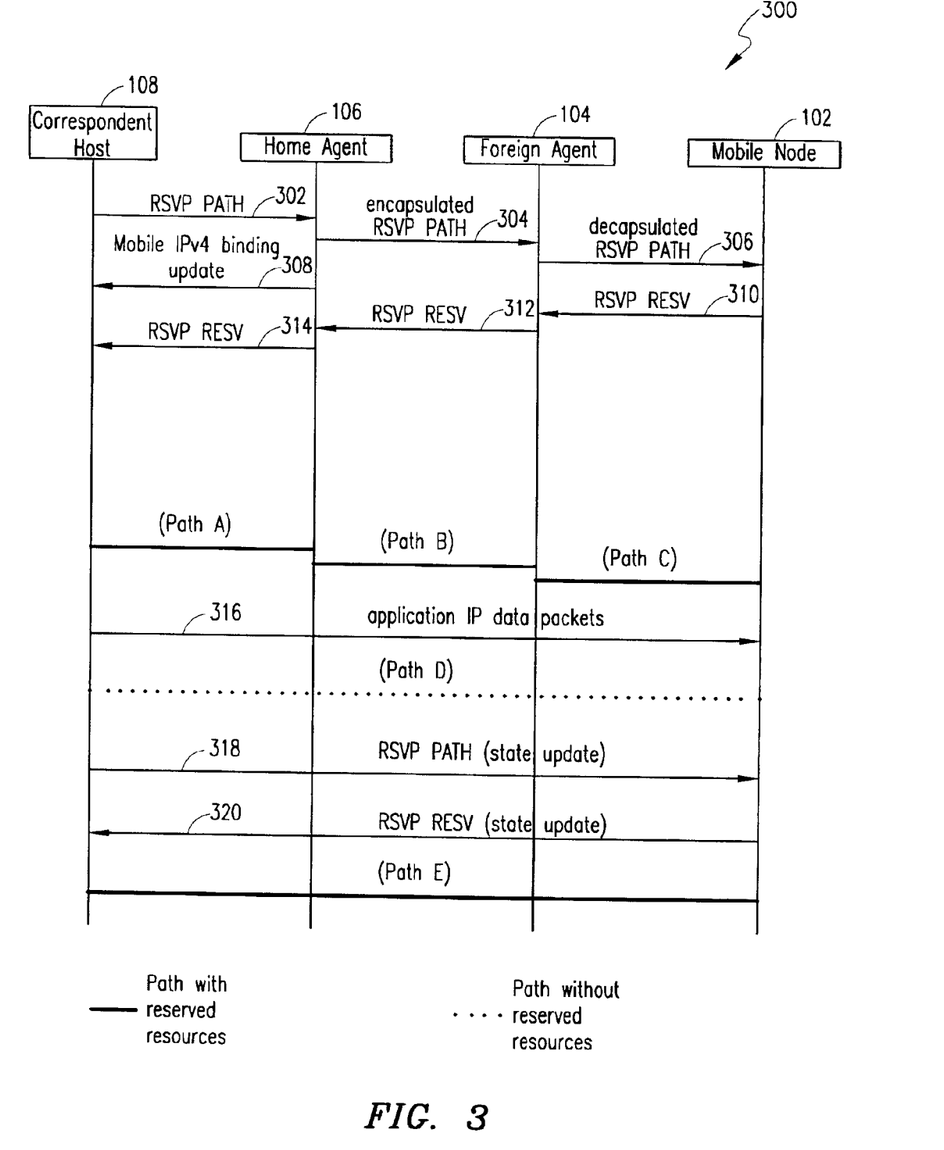
FIG. 3 is a messaging diagram illustrating interaction of RSVP with mobile space IPv4 during route optimization.

Reference is now made to FIG. 3, wherein there is shown a messaging diagram illustrating an exemplary interaction of RSVP with mobile IPv4 during route optimization. A message flow 300 is among the mobile node 102, the foreign agent 104, the home agent 106, and the correspondent host 108. It is assumed that the correspondent host 108 needs to begin a real-time packet-data application with the mobile node 102 and does not have a binding cache entry for the mobile node 102.

The correspondent host 108 sends an RSVP PATH message 302 to a home address of the mobile node 102, which address is the IP address of the home agent 106. In response to receipt of the RSVP PATH message 302, the home agent 106 encapsulates the message 302 and sends an encapsulated RSVP PATH message 304 to the foreign agent 104. Upon receipt of the message 304, the foreign agent 104 decapsulates the message 304 and sends a decapsulated RSVP PATH message 306 to the mobile node 102.

Because the mobile node 102 is not located in its home network, the home agent 106, in response to the RSVP PATH message 302 from the correspondent host 108, determines that the correspondent host 108 does not have a binding cache entry for the mobile node 102. The home agent 106 therefore sends a mobile IPv4 binding update message 308 to the correspondent host 108. In response to the mobile IPv4 binding update message 308, the correspondent host 108 creates a binding cache entry for the mobile node 102. The mobile IPv4 binding update message 308 can be sent by the home agent 106 at any point following receipt by the home agent 106 of the RSVP PATH message 302 from the correspondent host 108.

If the mobile node 102 agrees with the quality of service requirements specified in the RSVP PATH message 306, the mobile node 102 sends an RSVP RESV message 310 to the foreign agent 104. The RSVP RESV message 310 is forwarded to the home agent 106 by the foreign agent 104 via an RSVP RESV message 312 and is forwarded by the home agent 106 to the correspondent host 108 via an RSVP RESV message 314. Upon receipt of the RSVP RESV message 314, the correspondent host 108 considers the resource requirements specified in the RSVP PATH message 302 to be reserved for communications between the correspondent host 108 and the mobile node 102.

It is assumed for the purposes of FIG. 3 that a Path A has been reserved between the correspondent host 108 and the home agent 106, a Path B has been reserved between the home agent 106 and the foreign agent 104, and a Path C has been reserved between the foreign agent 104 and the mobile node 102, as a result of the RSVP messages 302, 304, 306, 310, 312, and 314.

If the correspondent host 108 and the mobile node 102 were operating only according to RSVP and not also according to mobile IP, the Paths A, B, and C would be used for communications between the correspondent host 108 and the mobile node 102. However, because the correspondent host 108 received the binding update message 308, and created a binding cache entry in response to the binding update message 308, the correspondent host 108 will send subsequent packets directly to the mobile node 102 without reference to the reserved Paths A, B, and C and will instead send these packets by a direct path from the correspondent host 108 to the mobile node 102, designated Path D.

In accordance with the binding update message 308, the correspondent host 108 sends application IP packet data to the mobile node 102 along the Path D, as shown by message 316. IP data packets will continue to be sent by the correspondent host 108 to the mobile node 102 along the Path D until the correspondent host 108 sends an RSVP PATH message 318 to the mobile node 102 and the mobile node 102 responds to the message 318 by sending an RSVP RESV message 320 to the correspondent host 108. The RSVP PATH message 318 is sent by the correspondent host 108 in order to update soft states in accordance with RSVP.

The RSVP PATH message 318 and the RSVP RESV message 320 are sent only after a pre-determined time period (e.g., 30 seconds) has elapsed after the correspondent host 108 received the RSVP RESV message 314. The RSVP PATH message 318 is sent directly to the mobile node 102 by the correspondent host 108 because the correspondent host 108 now has the care-of address of the mobile node 102. If resources requested in the RSVP PATH message 318 can be supported by the mobile node 102, the correspondent host 108 receives the RSVP RESV message 320 from the mobile node 102.

The RSVP PATH message 318 includes requirements for communication between the correspondent host 108 and the mobile node 102 via a Path E, so the Path E will be used for future communications between the correspondent host 108 and the mobile node 102 until a subsequent RSVP PATH message and RSVP RESV message are sent and received upon expiration of the soft states associated with the messages 318 and 320.

If, in contrast to FIG. 3, the mobile node 102 is located in its home network, the home agent 106 will not send a binding update message 308 to the correspondent node 108 because the home agent 106 knows the that the mobile node 102 is not being served by a foreign agent. Therefore, the path followed by subsequent packet data will be the path on which resources are reserved in accordance with RSVP (e.g., the Paths A, B, and C). In this situation, no inter-operability concerns between mobile IPv4 and RSVP are present.

FIG. 3 illustrates that resources reserved on the Paths A, B, and C will not be utilized by the application that began the RSVP packet-data session because of the binding update message sent by the home agent. In addition, quality of service requirements demanded by the application will not be satisfied because subsequent packets are sent via the Path D, on which no resources were reserved. Until the soft states expire and the correspondent host sends an RSVP PATH message directly to the mobile node to update the soft states, no reserved resources will be used for communications between the correspondent host and the mobile node. Interoperability between mobile IPv6 and RSVP is similar to interoperability of mobile IPv4 and RSVP. The main difference between mobile IPv4 and mobile IPv6 for purposes of embodiments of the present invention is that a foreign agent is not required in mobile IPv6. Therefore, the initiator of the binding update message is the mobile node rather than the home agent.

Figure 4:
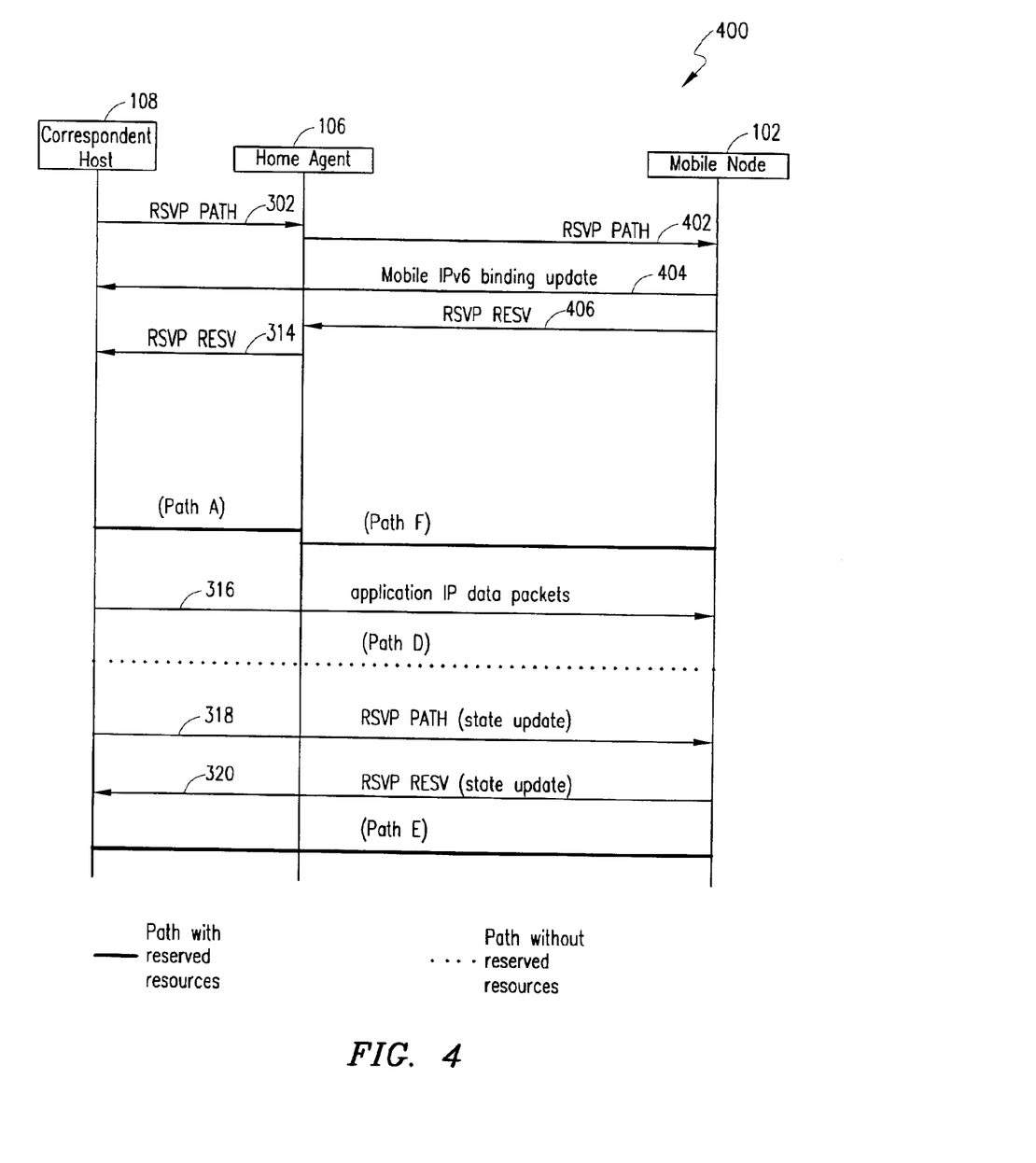
FIG. 4 is a messaging diagram illustrating interaction of RSVP with mobile IPv6 during route optimization.

Reference is now made to FIG. 4, wherein there is shown a messaging diagram illustrating interaction of RSVP with mobile IPv6 during route optimization. The message flow 400 is among the mobile node 102, the home agent 106, and the correspondent host 108. It is assumed that the correspondent host 108 needs to begin a real-time packet-data application with the mobile node 102 and does not have a binding cache entry for the mobile node 102.

The correspondent host sends an RSVP PATH message 302 to a home address of the mobile node 102, which address is the IP address of the home agent 106. In response to receipt of the RSVP PATH message 302, the home agent 106 sends an RSVP PATH message 402 to the mobile node 102.

Because the mobile node 102 is not located in its home network, the mobile node 102, in response to the RSVP PATH message 402 from the home agent 106, discovers that the correspondent host 108 does not have a binding cache entry for the mobile node 102. The mobile node 102 therefore sends a mobile IPv6 binding update message 404 to the correspondent host 108. In response to the mobile IPv4 binding update message 404, the correspondent host 108 creates a binding cache entry for the mobile node 102. The mobile IPv4 binding update message 404 can be sent by the mobile node 102 at any point following receipt by the mobile node 102 of the RSVP PATH message 402 from the home agent 106.

If the mobile node 102 agrees with the quality of service requirements specified in the RSVP PATH message 402, the mobile node 102 sends an RSVP RESV message 406 to the home agent 106. The RSVP RESV message 406 is forwarded by the home agent 106 to the correspondent host 108 via the RSVP RESV message 314. Upon receipt of the RSVP RESV message 314, the correspondent host 108 considers the resource requirements specified in the RSVP PATH message 302 to be reserved for communications between the correspondent host 108 and the mobile node 102.

It is assumed for the purposes of FIG. 3 that a Path A has been reserved between the correspondent host 108 and the home agent 106 and a Path F has been reserved between the home agent 106 and the mobile node 102 as a result of the RSVP messages 302, 402, 406, and 314.

If the correspondent host 108 and the mobile node 102 were operating only according to RSVP and not also according to mobile IP, the Paths A and F would be used for communications between the correspondent host 108 and the mobile node 102. However, because the correspondent host 108 received the binding update message 404, and created a binding cache entry in response to the binding update message 404, the correspondent host 108 will send subsequent packets directly to the mobile node 102 without reference to the reserved Paths A and F and will instead send these packets by a direct path from the correspondent host 108 to the mobile node 102, designated Path D.

In accordance with the binding update message 404, the correspondent host 108 sends application IP packet data to the mobile node 102 along the Path D, as shown by message 316. IP data packets will continue to be sent by the correspondent host 108 to the mobile node 102 along the Path D until the correspondent host 108 sends an RSVP PATH message 318 to the mobile node 102 and the mobile node 102 responds to the message 318 by sending an RSVP RESV message 320 to the correspondent host 108. The RSVP PATH message 318 is sent by the correspondent host 108 in order to update soft states in accordance with RSVP.

The RSVP PATH message 318 and the RSVP RESV message 320 are sent only after a pre-determined time period (e.g., 30 seconds) has elapsed after the correspondent host 108 receives the RSVP RESV message 314. The RSVP PATH message 318 is sent directly to the mobile node 102 by the correspondent host 108 because of the correspondent host 108 now has the care-of address of the mobile node 102. If resources requested in the RSVP PATH message 318 can be supported by the mobile node 102, the correspondent host 108 receives the RSVP RESV message 320 from the mobile node 102.

The RSVP PATH message 318 includes requirements for communication between the correspondent host 108 and the mobile node 102 via the Path E, so that the Path E will be used for future communications between the correspondent host 108 and the mobile node 102 until a subsequent RSVP PATH message and RSVP RESV message are sent and received upon expiration of the soft states associated with the messages 318 and 320.

If, in contrast to FIG. 4, the mobile node 102 is located in its home network, the mobile node 102 will not send a binding update message 404 to the correspondent host 108 because the mobile node 102 knows that it is not in a foreign network. Therefore, the path followed by subsequent packet data will be the path on which resources are reserved in accordance with RSVP (e.g., the Paths A and F). In this situation, no inter-operability concerns between mobile IPv6 and RSVP are present.

FIG. 4 illustrates that resources reserved on the Paths A and F will not be utilized by the application that began the RSVP packet-data session because of the binding update message sent by the mobile node. In addition, quality of service requirements demanded by the application will not be satisfied, because subsequent packets are sent via the Path D, of which no resources were reserved. Until the soft states expire and the correspondent host sends an RSVP PATH message directly to the mobile node to update the soft states, no reserved resources will be used for communications between the correspondent host and the mobile node.

Figure 5:
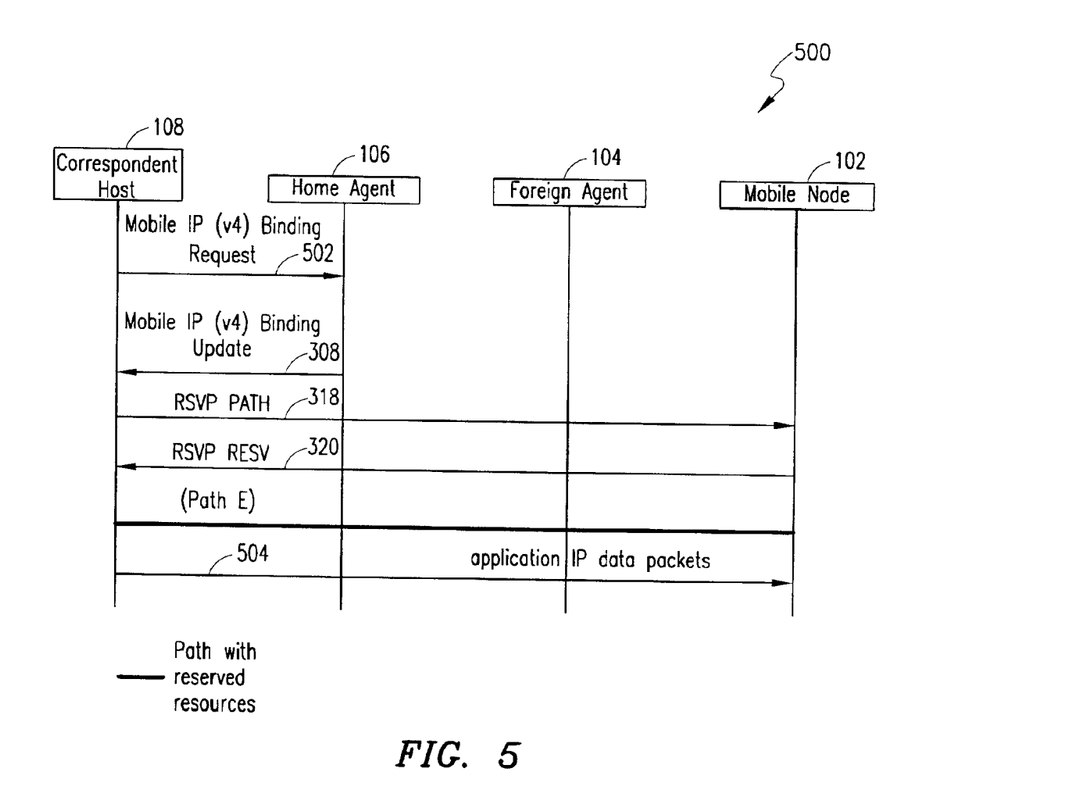
FIG. 5 is a messaging diagram illustrating interaction of RSVP with mobile IPv4 during route optimization in accordance with the present invention.

Reference is now made to FIG. 5, wherein there is shown a messaging diagram illustrating interaction of RSVP with mobile IPv4 during route optimization in accordance with the present invention. The interaction depicted herein, operating according to principles of the present invention, solves the interoperability problem between RSVP and Mobile IP during route optimization, such as, for example, that depicted in FIG. 3. A message flow 500 is among the mobile node 102, the foreign agent 104, the home agent 106, and the correspondent host 108. It is assumed that the correspondent host 108 needs to begin a real-time packet-data application with the mobile node 102 and does not have a binding cache entry for the mobile node 102.

The correspondent host 108 first sends a mobile IPv4 binding request message 502 to the home agent 106. The correspondent host 108 then waits for a response to the message 502 before sending any further messages. The home agent 106 responds to the message 502 by sending a mobile IPv4 binding update message 308 to the correspondent host 108. After the correspondent host 108 receives the binding update message 308, the correspondent host 108 knows the care-of address of the mobile node 102 and can create a binding that specifies an association of the home address of the mobile node 102 with a care-of address for the mobile node 102, along with a remaining lifetime of the association. The binding is stored by the correspondent host 108 in a binding cache and is used to tunnel IP packet data directly to the care-of address of the mobile node 102, thereby bypassing the home agent 106 of the mobile node 102. Thus, the triangular routing situation described with respect to FIG. 3 is avoided. After the binding has been created, all packets sent by the correspondent host 108 to the mobile node 102 have as a destination address the care-of address of the mobile node 102.

Accordingly, the correspondent host 108, which now knows the care-of address of the mobile node 102, sends an RSVP PATH message 318 directly to the mobile node 102. The mobile node 102 responds to the message 318 by sending an RSVP RESV message 320 to the correspondent host 108. Unlike with respect to FIG. 3, in FIG. 5, the messages 318 and 320 are not sent in response to expiration of a soft state, but rather are sent following binding of a care-of address of the mobile node 102 by the correspondent host 108.

In a similar fashion to that described in FIG. 3, if resources requested in the RSVP PATH message 318 can be supported by the mobile node 102, the correspondent host 108 receives the RSVP RESV message 320 from the mobile node 102. The RSVP PATH message 318 includes requirements for communication between the correspondent host 108 and the mobile node 102 via the Path E, so that the Path E will be used for future communications between the correspondent host 108 and the mobile node 102 until a subsequent RSVP PATH message and RSVP RESV message are sent and received upon expiration of the soft states associated with the messages 318 and 320. Following establishment of the Path E between the correspondent host 108 and the mobile node 102, application IP data packets can be sent between the correspondent host 108 and the mobile node 102, as shown by the message 504.

Unlike the flow 300, in the flow 500, use of the Path E between the correspondent host 108 and the mobile node 102 is not dependent upon expiration of the soft states, but rather is established directly between the correspondent host 108 and the mobile node 102 with reference to QoS requirements and also avoids the triangular routing situation described with respect to the flow 300. In addition, the quality of service requirements demanded by the application will be satisfied, because subsequent application IP data packets will follow path E, along which resources have been reserved.

Figure 6:
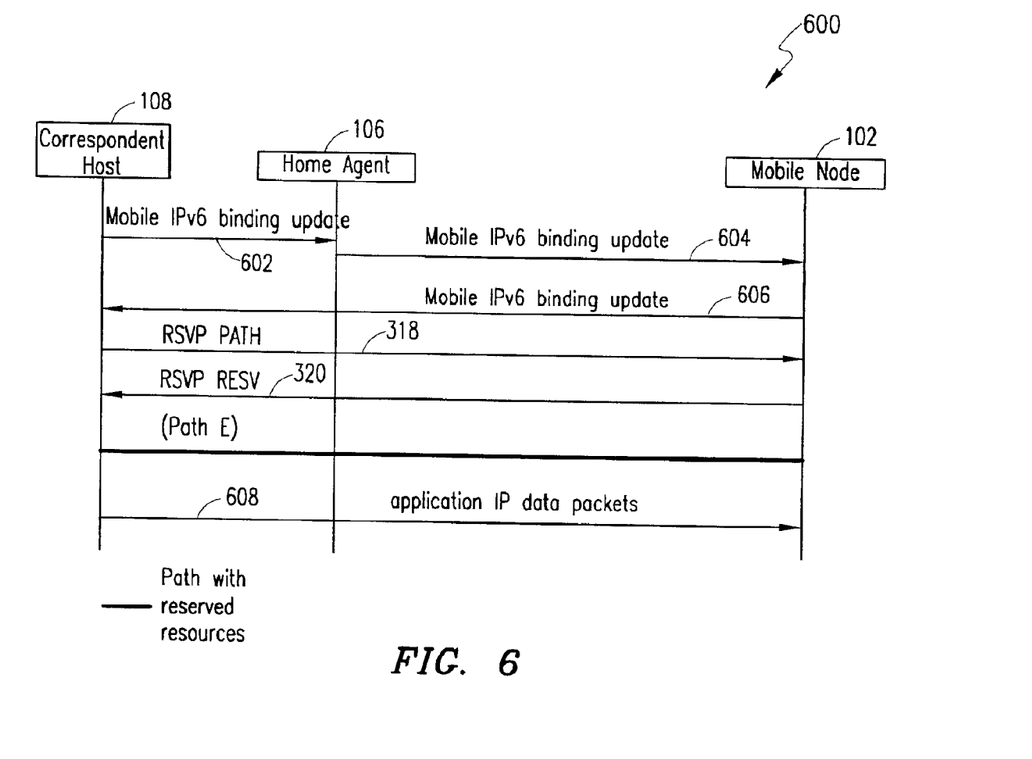
FIG. 6 is a messaging diagram illustrating interaction of RSVP with mobile IPv6 during route optimization in accordance with the present invention.

Reference is now made to FIG. 6, wherein there is shown a messaging diagram illustrating interaction of RSVP with mobile IPv6 during route optimization in accordance with the present invention. The interaction depicted herein, operating according to principles of the present invention, solves the interoperability problem between RSVP and Mobile IP during route optimization as depicted for example, in FIG. 4. A message flow 600 is among the mobile node 102, the home agent 106, and the correspondent host 108. It is assumed that the correspondent host 108 needs to begin a real-time packet-data application with the mobile node 102 and does not have a binding cache entry for the mobile node 102.

The correspondent host 108 first sends a mobile IPv6 binding request message 602 to the home agent 106. The correspondent host 108 then waits for a response to the message 602 before sending any further messages. The home agent 106 forwards the mobile IPv6 binding request message 602 to the mobile node 102 via a mobile IPv6 binding request message 604. The mobile node 102 responds to the message 602 by sending a mobile IPv6 binding update message 606 to the correspondent host 108. After the correspondent host 108 receives the binding update message 606, the correspondent host 108 knows the care-of address of the mobile node 102 and can create a binding that specifies an association of the home address of the mobile node 102 with a care-of address for the mobile node 102, along with a remaining lifetime of the association. The binding is stored by the correspondent host 108 in a binding cache and is used to tunnel IP packet data directly to the care-of address of the mobile node 102, thereby bypassing the home agent 106 of the mobile node 102. Thus, the triangular routing situation described with respect to FIG. 4 is avoided. After the binding has been created, all packets sent by the correspondent host 108 to the mobile node 102 have as a destination address the care-of address of the mobile node 102.

Accordingly, the correspondent host 108, which now knows the care-of address of the mobile node 102, sends an RSVP PATH message 318 directly to the mobile node 102. The mobile node 102 responds to the message 318 by sending an RSVP RESV message 320 to the correspondent host 108. Unlike with respect to FIG. 4, in FIG. 6, the messages 318 and 320 are not sent in response to expiration of a soft state, but rather are sent following binding of a care-of address of the mobile node 102 by the correspondent host 108.

In a similar fashion to that described in FIG. 4, if resources requested in the RSVP PATH message 318 can be supported by the mobile node 102, the correspondent host receives the RSVP RESV message 320 from the mobile node 102. The RSVP PATH message 318 includes requirements for communication between the correspondent host 108 and the mobile node 102 via the Path E, so that the Path E will be used for future communications between the correspondent host 108 and the mobile node 102 until a subsequent RSVP PATH message and RSVP RESV message are sent and received upon expiration of the soft state associated with the messages 318 and 320.

Unlike the flow 400, in the flow 600, use of the Path E between the correspondent host 108 and the mobile node 102 is not dependent upon expiration of the soft states, but rather is established directly between the correspondent host and the mobile node 102 with reference to QoS requirements and also avoids the triangular routing situation described with respect to the flow 400. Following establishment of the Path E, application IP data packets can be sent between the correspondent host 108 and the mobile node 102, as shown by the message 608. In addition, quality of service requirements demanded by the application will be satisfied, because subsequent application IP data packets will follow path E, where resources have been reserved.

Although preferred embodiment(s) of the present invention have been illustrated in the accompanying Drawings and described in the foregoing Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A route-optimization method comprising the steps of:
   sending a binding request;
   receiving a binding update in response to the binding request, wherein the binding update includes a care-of address of a mobile node;
   creating a binding to the care-of address responsive to receipt of the binding update;
   sending a RSVP PATH message responsive to receipt of the binding update, wherein the RSVP PATH message explicitly binds a data path of a packet flow to the mobile node; and
   receiving a RSVP RESV message responsive to the RSVP PATH message.

2. The method of claim 1 wherein a correspondent host performs the steps of sending the binding request, receiving the binding update, creating the binding, sending the path message, and receiving the reservation request message.

3. The method of claim 1 operating according to mobile IP version 4.

4. The method of claim 1 operating according to mobile IP version 6.

5. A correspondent host adapted to:
   send a binding request;
   receive a binding update in response to the binding request, wherein the binding update includes a care-of address of a mobile node;
   create a binding to the care-of address responsive to receipt of the binding update;
   send a RSVP PATH message responsive to receipt of the binding update, wherein the RSVP PATH message explicitly binds a data path of a packet flow to the mobile node; and
   receive a RSVP RESV message responsive to the RSVP PATH message.

6. The host of claim 5 adapted to operate according to mobile IP version 4.

7. The host of claim 5 adapted to operate according to mobile IP version 6.

8. A route-optimization method comprising the steps of:
   receiving a binding request; and
   sending a binding update in response to the binding request, wherein the binding update includes a care-of address of a mobile node, a binding to the care-of address is created responsive to receipt of the binding update, a RSVP PATH message that explicitly binds a data path of a packet flow to the mobile node is sent responsive to receipt of the binding update, and a RSVP RESV message is sent responsive to the RSVP PATH message.

9. The method of claim 8 wherein the steps of receiving and sending are performed by a home agent.

10. The method of claim 8 wherein the steps of receiving and sending are performed by the mobile node.

11. The method of claim 8 operating according to mobile IP version 4.

12. The method of claim 8 operating according to mobile IP version 6.

13. A route-optimization method comprising the steps of:
   receiving a binding request;
   sending a binding update in response to the binding request, wherein the binding update includes a care-of address of a mobile node;
   receiving a RSVP PATH message sent in response to receipt of the binding update, wherein the RSVP PATH message explicitly binds a data path of a packet flow to the mobile node; and
   sending a RSVP RESV message responsive to the RSVP PATH message.

14. The method of claim 13 wherein the steps of receiving the binding request, sending the binding update, receiving the path message, and sending the reservation request message are performed by the mobile node.

15. The method of claim 13 wherein the steps of receiving the binding request and sending the binding update are performed by a home agent and the steps of receiving the path message and sending the reservation request message are performed by the mobile node.

16. The method of claim 13 operating according to mobile IP version 4.

17. The method of claim 13 operating according to mobile IP version 6.

18. A home agent adapted to:
   receive a binding request; and
   send a binding update in response to the binding request, wherein the binding update includes a care-of address of a mobile node, a binding to the care-of address is created responsive to receipt of the binding update, a RSVP PATH message that explicitly binds a data path of a packet flow to the mobile node is sent responsive to receipt of the binding update, and a RSVP RESV message is sent responsive to the RSVP PATH message.

19. The agent of claim 18 adapted to operate according to mobile IP version 4.

20. A route-optimization system comprising:
   a home agent receiving a binding request and sending a binding update responsive to the binding request, wherein the binding update includes a care-of address of a mobile node; and
   a correspondent host receiving the binding update, sending a RSVP PATH message, the RSVP PATH message explicitly binding a data path of a packet flow to the mobile node, in response to receipt of the binding update, and receiving a RSVP RESV message responsive to the RSVP PATH message.

21. The system of claim 20 adapted to operate according to mobile IP version 4.

* * * * *